United States Patent [19]

Xuereb

[11] 4,205,450

[45] Jun. 3, 1980

[54] DRAFTING INSTRUMENT FOR PERSPECTIVE DRAWING AND OTHER USES

[76] Inventor: Edgar Xuereb, 43j/4, St. Paul's Blgs., West St., Valletta, Malta

[21] Appl. No.: 884,919

[22] Filed: Mar. 9, 1978

[30] Foreign Application Priority Data

Mar. 11, 1977 [GB] United Kingdom ............... 10321/77

[51] Int. Cl.² ............................................... G01B 3/08
[52] U.S. Cl. ...................................... 33/161; 33/27 C
[58] Field of Search .............................. 33/161, 27 C

[56] References Cited

U.S. PATENT DOCUMENTS

| 909,068 | 1/1909 | Denman et al. | 33/161 |
|---|---|---|---|
| 1,288,556 | 12/1918 | Gasstrom | 33/161 |
| 1,299,627 | 4/1919 | Simon | 33/161 |
| 1,629,829 | 5/1927 | Linn | 33/161 |
| 2,245,646 | 6/1941 | Bullivant | 33/161 X |
| 3,492,737 | 2/1970 | Swanson | 33/161 |

*Primary Examiner*—Charles E. Phillips

[57] ABSTRACT

To draw lines in a direction leading to a point it is necessary to locate the ruling edge of a common ruler or straight-edge on the fixed point each time such a thin line is drawn, and in the case of thick lines care has to be taken to put the ruling edge away from the fixed point by a distance equal to one-half the thickness of the line to be drawn.

When the fixed point is a comparatively long distance away necessitating the manipulation of a long and hence cumbersome straight-edge, the process becomes tedious and laborious and tends to lack in accuracy.

The invented ruler with its telescopic and rotating action combined with its aligning device is intended to facilitate the accurate and quick drawing of such lines.

7 Claims, 10 Drawing Figures

U.S. Patent  Jun. 3, 1980  4,205,450
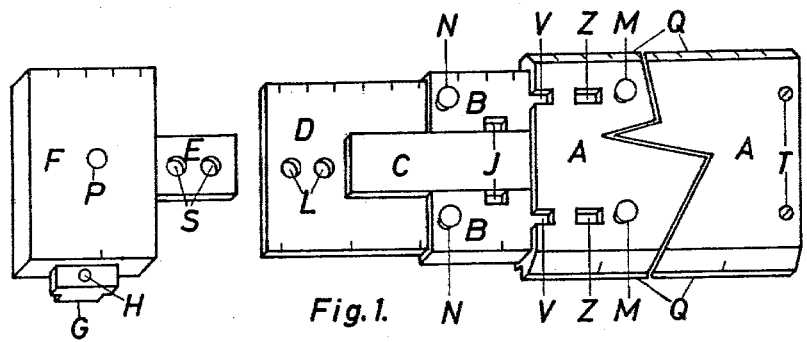
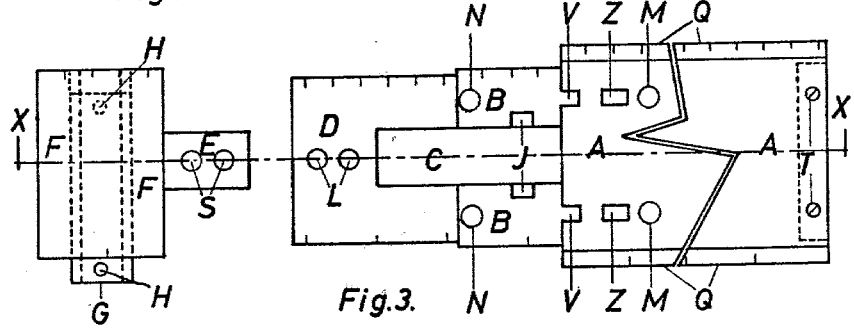
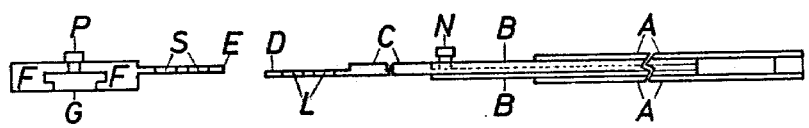
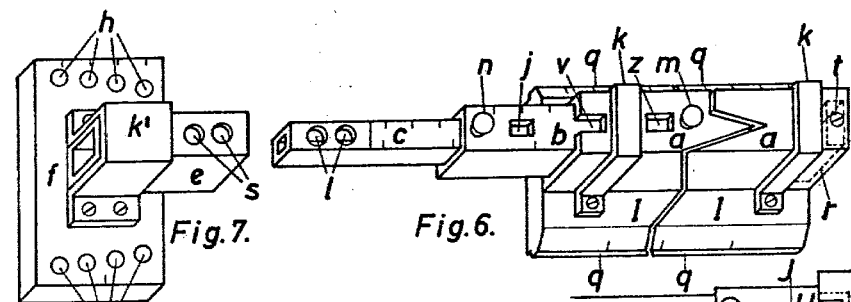
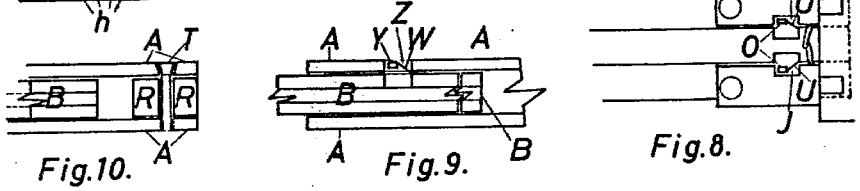

DRAFTING INSTRUMENT FOR PERSPECTIVE DRAWING AND OTHER USES

DESCRIPTION

This invention relates to a graduated ruler with a telescopic extension and an aligning device.

A common difficulty encountered and which could be the cause for the reduction in the size of an architectural or engineering drawing is due to the fact that lines in a desirably larger drawing would have to be drawn in a direction leading to a point which either falls beyond the reach of a straight-edge of ordinary length or falls outside the drawing board. This difficulty is particularly, though not exclusively, evident in perspective drawing where the many parallel lines converging to the same vanishing point, although these are not necessarily long lines, yet their direction towards a comparatively distant vanishing point is essential. In such cases normally a pin is positioned on the vanishing point to align the inevitably long straight-edge towards this point every time a line has to be drawn in its direction. The frequent manipulation of a long straight-edge for drawing such lines and its frequent necessary removal from the actual drawing area in order to allow for the filling in of other details becomes a tedious, cumbersome and time consuming process.

Another difficulty met with is in the drawing of lines of different thickness whose longitudinal centre lines have to lead to a fixed point. In such cases the ruling edge has to be kept away from the fixed point at a distance estimated to be equal to onehalf the thickness of the lines to be drawn, since by aligning the ruling edge against a pin positioned centrally on the fixed point will not give accurate results unless the pin is of a diameter equal to the thickness of the line to be drawn along the ruling edge. It becomes more awkward to draw such lines when the fixed point comes beyond the reach of a straight-edge of ordinary length, and even more so when the fixed point falls outside the drawing board. In both cases a very long and consequently unwieldy straight-edge would have to be manipulated.

Yet another difficulty commonly met with is in the drawing of circles or parts of circles of a comparatively large radius especially when their centre is outside the drawing board. The practice of tying one end of a strong string or thin wire to a pin fixed centrally on the centre of the circle and drawing the required circle or part of a circle by means of a pen or pencil attached to the other end of the string or wire, leaves a lot to be desired where accuracy is essentail. Accuracy can be achieved by the use of a beam compass with a very long beam, but this presents handling difficulties when operated by one person.

Having mentioned some of the difficulties which this invention, with its telescopic and rotating action combined with its aligning device, is intended to overcome, I shall now describe it making reference to the accompanying drawing containing ten figures, namely;

FIG. 1. Axonometric projection of the telescopic ruler.

FIG. 2. Axonometric projection of the attachment with aligning device.

FIG. 3. Top plan of the telescopic ruler.

FIG. 4. Top plan of the attachment with aligning device.

FIG. 5. Section X-X through attachment and ruler.

FIG. 6. Axonometric projection of a conventional ruler attached to a telescopic contrivance.

FIG. 7. Axonometric projection of an alternative attachment containing aligning circular holes (based on application with Ser. No. 736,154 and Filing date Oct. 27, 1976 submitted by the undersigned).

FIG. 8. Plan showing slots J in member B with corresponding slots in member C containing springs U with heads O.

FIG. 9. Section showing rectangular hole Z in member A with corresponding rectangular hole in member B containing spring W with head Y.

FIG. 10. Section showing blocking piece R fixed to member A by screw T.

FIGS. 1, 3 and 5 show the ruler made up of three component members A, B and CD. The number of such members as well as their cross-section may vary according to requirements and depending on the material used.

Member A consists of a conventional graduated ruler of sufficient thickness to allow of its being hollow along its whole length to contain a member B which can slide smoothly and freely inside it. Member A is provided with: (i) a blocking piece R fixed by screws T at one extremity to prevent member B from sliding out of it in this direction as shown in FIG. 10; (ii) rectangular holes Z to block the heads Y of the springs W fixed to member B, to prevent member B from sliding out of it in the opposite direction beyond a determined limit, as shown in FIG. 9; (iii) clamping screws M to hold member B in any desired intermediate position; (iv) slots V to house clamping screws N when member B is fully contained in it.

Member B is shorter than member A by an amount equal to the width of the blocking piece R and has a hollow rectangular section throughout its whole length with the middle third of the upper side cut off. Member B is also provided with: (i) a blocking piece similar to R at one extremity to prevent member CD from sliding out of it in this direction; (ii) slots J to block heads O of the springs U fixed to member CD, to prevent member CD from sliding out of it in the opposite direction beyond a determined limit, as shown in FIG. 8; (iii) clamping screws N to hold member CD in any desired intermediate position.

Member CD is shorter than member B by an amount equal to the width of the end blocking piece in member B, and consists of a solid shallow inverted T-section along the part C with a flat part D at one extremity containing threaded holes L corresponding to the holes S shown in FIGS. 2, 4 and 5.

The attachment containing an aligning device shown in FIGS. 2, 4 and 5, consists of a solid rectangular member F with a projecting part E having two holes S corresponding to the above described holes L in the flat part D. The two parts E and D are securely fixed together by means of screws passing through holes S and tightened in the threaded holes L. The thickness of the projecting part E is equal to the projection of part C over part D so that part E can also slide along member B and inside member A. The longer side of the rectangular solid member F is shorter than the total external width of the main containing ruler A by an amount equal to at least one diameter of either of the circular holes H to allow for the positioning of an accommodating pivot with its centre in line with an extension of the ruling edge Q. Said member F is of the same thickness as member A so that their respective bottom and upper faces come in one plane, and is grooved along its whole length in the form of a T-section to receive a movable fixable member G having the same section. Said member G contains a circular hole H at either extremity to accommodate a pivot member round which the ruler and attachment can freely turn. The centre of either hole H is held in the desired position relative to an extension of the ruling edge Q by a clamping screw P.

To illustrate the beneficial uses of the invention to overcome some of the difficulties ordinarily met with and referred to above, the following examples are being quoted:

For perspective drawing, the invented ruler, with the centre of either of its holes H securely held in line with an extension of the corresponding ruling edge Q and with the said hole H inserted in an accommodating pivot centrally positioned on a vanishing point, does the function of a long straight-edge with the added expedient advantage of the possibility of member A containing the ruling edge Q being pushed away from, or pulled back to, the actual drawing area without altering the direction of the ruling edge Q towards the vanishing point.

For the drawing of thick lines whose longitudinal centre line has to lead to a point, such as for example in the drawing of spokes in a wheel, the invented ruler eliminates the necessity of having to estimate or measure the distance that the ruling edge has to be kept away from the fixed point every time such a thick line is drawn. By setting and fixing the centre of either hole H laterally away from an extension of the ruling edge Q by an amount equal to one-half the thickness of the line representing the spoke, inserting hole H in an accommodating pivot centrally positioned on the centre of the wheel, and rotating the ruler round the pivot, all such spokes can be accurately and promptly drawn along the ruling edge Q.

For the drawing of circles or parts of circles of a large radius, especially when their centres come outside the drawing board, these can be expeditiously drawn by fixing the centre of either hole H in line with an extension of the ruling edge Q, inserting the hole H in an accommodating pivot, securing members A, B and CD in the required position by means of the respective clamping screws M and N, and rotating the ruler round the pivot with a scriber firmly held against the corresponding ruling edge Q.

The same telescopic, aligning and rotating results can also be obtained by the combination shown in FIGS. 6 and 7 and described below, such combination consisting of a conventional graduated ruler fixed to the outermost containing member of a graduated telescopic contrivance adapted for the purpose, said telescopic contrivance also having its innermost graduated contained member suitably adapted to be fixed to either of the aligning devices shown in FIGS. 2, 4 and 5, and in FIG. 7.

FIG. 6 shows a combination of a conventional graduated ruler I which is attached by flat straps k to the outermost containing member 'a' of a telescopic contrivance shown consisting of three component members 'a', b and c, again provided with stoppers r, blocking holes z and j with corresponding springs with heads, and clamping screws m and n, as well as with holes 1 at the extremity of the innermost contained member c, said holes 1 corresponding with holes s in the projecting part e of the aligning attachment shown in FIG. 7. Said attachment is shown consisting of a rectangular block f containing a series of holes h at either extremity of its longer side, one of the holes having its centre in line with the ruling edge q, the other holes having their centres laterally away from an extension of the ruling edge q at distances equal to one-half the thickness of the lines to be drawn. The said rectangular block f is also shown provided with a member e attached to it by flat strap k'; said member e having the same cross section as the telescopic member b, so that it can contain telescopic member c and at the same time fit in the outermost containing member 'a' when the telescopic contrivance is fully closed. Members e and c are securely fixed together with passing screws through the upper hole s, then through upper and lower holes 1, and tightened to the lower threaded hole s. The thickness of the said block f to be such that its bottom face lies in the same plane as the bottom face of the ruler I.

Evidently, if the telescopic effect is not required, either of the two aligning attachments shown in FIGS. 2, 4 and 5, and in FIG. 7 in the accompanying drawing can be easily adapted to be fixed directly on to a conventional ruler.

What I claim is:

1. A drafting instrument consisting of the combination of a conventional graduated ruler of sufficient thickness to serve as a containing member for one or more members, said members being capable of sliding smoothly and freely wihin and parallel to one another, and of an aligning device consisting of a suitably sized rectangular block attachable to one end of the innermost contained sliding member, said block housing a moveable fixable gauged member havng a T-shaped cross-section such that the bottom face of the said gauged member is in the same plane as the bottom faces of its containing block and of the said conventional graduated ruler, said moveable fixable gauged member being provided at each end with a circular hole intended to accommodate a pivot member round which the instrument can be made to turn, said moveable fixable gauged member serving to set and securely hold the center of either hole in line with an extension of the corresponding ruling edge of the said conventional graduated ruler, or laterally away from said extension at different distances respectively equal to one-half of the desired thickness of the lines to be drawn; the extension of the longitudinal center lines of all the lines so drawn will pass through the center of the hole.

2. A drafting instrument consisting of the combination of a conventional graduated ruler of sufficient thickness to serve as a containing member for one or more graduated members, said members being capable of sliding smoothly and freely within and parallel to one another, and of an aligning device consisting of a suitably sized rectangular block attachable to the end of the innermost contained sliding member, said block provided at each end with a plurality of circular holes intended to accommodate a pivot member round which the drafting instrument can be made to turn, said holes having their centers spaced laterally of an extension of the corresponding ruling edge of the said conventional graduated ruler at different distances respectively equal to one-half of the thickness of the lines to be drawn, and an additional hole at either end being in line with the respective extension of the ruling edge of the said graduated conventional ruler.

3. A drafting instrument as defined in claim 1 or claim 2, the sliding members being provided with blocking pieces at one end to prevent the said members from sliding away from each other in this direction, said sliding members further provided with a blocking device some distance away from the other end to prevent said members from sliding away from each other in the opposite direction and also ensure adequate overlapping between the said members when extended.

4. A drafting instrument as defined in claim 1 or in claim 2, the sliding members being further provided with any clamping device to hold them in a desired intermediate position relative to each other.

5. A drafting instrument consisting of the combination comprising: (a) a conventional graduated ruler, (b) any known telescopic contrivance, and (c) an aligning device; said telescopic contrivance having its outermost containing member adapted to be securely fixed to the upper face of the said conventional ruler and having the opposite end of its innermost contained member adapted to be securely fixed to the said aligning device, the longitudinal axis of the said telescopic contrivance being parallel to the ruling edges of the conventional graduated ruler, the bottom face of the said aligning device and the bottom face of the conventional ruler being in one plane; said aligning device consisting of a suitably sized rectangular block attachable to one end of the innermost contained sliding member of the said telescopic contrivance, said block housing a moveable fixable gauged member having a T-shaped cross-section such that the bottom face of the said gauged member is in the same plane as the bottom faces of its containing block and of the said conventional graduated ruler, said moveable fixable gauged member being provided at each end with a circular hole intended to accommodate a pivot member round which the instrument can be made to turn, said moveable fixable gauged member serving to set and securely hold the center of either hole in line with an extension of the corresponding ruling edge of the said conventional graduated ruler, or laterally away from said extension at different distances respectively equal to one-half the desired thickness of the lines to be drawn; the extension of the longitudinal center lines of all the lines so drawn will pass through the center of the hole.

6. A drafting instrument as defined in claim 5, the sliding members of the telescopic contrivance being provided with blocking pieces at one end to prevent said members from sliding away from each other in this direction, and further provided with a blocking device some distance away from the other end to prevent said members from sliding out of each other in the opposite direction, and also to ensure adequate overlapping between the said members when extended.

7. A drafting instrument as defined in claim 5, the sliding members of the telescopic contrivance being further provided with a clamping device to hold them in a desired intermediate position relative to each other.

* * * * *